United States Patent
Dey et al.

(10) Patent No.: US 10,902,447 B2
(45) Date of Patent: **\*Jan. 26, 2021**

(54) METHOD, MEDIUM, AND SYSTEM FOR COGNITIVE PRICE TAGS BASED ON SHAKE SIGNATURE

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( \* ) Notice: Subject to any disclaimer, the term of this patent is extended or adjusted under 35 U.S.C. 154(b) by 118 days.

This patent is subject to a terminal disclaimer.

(21) Appl. No.: 16/365,761

(22) Filed: Mar. 27, 2019

(65) Prior Publication Data
US 2019/0220880 A1 Jul. 18, 2019

Related U.S. Application Data

(63) Continuation of application No. 15/410,157, filed on Jan. 19, 2017, now Pat. No. 10,255,612, which is a (Continued)

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0207* (2013.01); *G06Q 30/0601* (2013.01)

(58) Field of Classification Search
CPC .............. G06Q 30/0207; G06Q 30/0601
See application file for complete search history.

(56) References Cited

U.S. PATENT DOCUMENTS

| 5,151,684 A | 9/1992 | Johnsen |
| 6,703,934 B1 | 3/2004 | Nijman et al. |
| 6,924,781 B1 | 8/2005 | Gelbman |
| 9,092,814 B2 | 7/2015 | Timm et al. |
| 2002/0109593 A1 | 9/2002 | Swartzel et al. |

(Continued)

FOREIGN PATENT DOCUMENTS

| CN | 102802049 | 11/2012 |
| CN | 103226782 | 7/2013 |
| CN | 105139234 | 12/2015 |

OTHER PUBLICATIONS appcrawlr.com., "10 Best Apps for Shake to Unlock", http://apperawlr.com/android-apps/best-apps-shake-to-unlock, last visited on Mar. 30, 2016, pp. 1-5. (Year: 2016).*

(Continued)

*Primary Examiner* — Matthew E Zimmerman
(74) *Attorney, Agent, or Firm* — Fleit Intellectual Property Law; Donna Flores

(57) ABSTRACT

Various embodiments determine a dynamic price of a combination of items for sale via a smart price tag attached to one of the items. A back-end price server receives a request to register a user and product combination. The product is associated with a first item for sale. The user and product combination is registered as a unique gesture at the back-end server. The back-end price server further receives a request for a current price for a combination of the first item for sale and a second item for sale and determines the current price of the combination of the first item for sale and the second item for sale for a user profile handle mapped to the unique gesture.

15 Claims, 11 Drawing Sheets

Related U.S. Application Data continuation-in-part of application No. 15/259,429, filed on Sep. 8, 2016, now Pat. No. 10,210,562.

(56) References Cited

U.S. PATENT DOCUMENTS

| | | | |
|---|---|---|---|
| 2005/0122564 | A1 | 6/2005 | Zehner |
| 2005/0218218 | A1* | 10/2005 | Koster .................... G09F 3/204 235/383 |
| 2009/0313587 | A1 | 12/2009 | Goodwin |
| 2010/0100506 | A1 | 4/2010 | Marot |
| 2011/0289023 | A1 | 11/2011 | Forster et al. |
| 2012/0166261 | A1 | 6/2012 | Velusamy et al. |
| 2013/0187850 | A1* | 7/2013 | Schulz ...................... G06F 3/03 345/156 |
| 2013/0226742 | A1 | 8/2013 | Johnson et al. |
| 2013/0275261 | A1 | 10/2013 | Yoked |
| 2016/0063529 | A1 | 3/2016 | Roeding et al. |
| 2017/0169264 | A1 | 6/2017 | Britt et al. |

OTHER PUBLICATIONS

Shake, "Shake—Android Apps on Google Play", https://play.google.com/store/apps/details?id=com.adl.appshaker&hl=en, last visited on Mar. 30, 2016, pp. 1-1.

Mobile Communication Media, "Shake Messenger—What is Shake Messenger", http://www.shakemessenger.com/, last visited on Mar. 30, 2016, pp. 1-5.

Shakeshake! for SayHi, "ShakeShake! forSayHi—Android Apps on Google Play", https://play.google.com/store/apps/details?id=com.sayhi.plugin.shakeshake, last visited on Mar. 30, 2016, pp. 1-3.

Shake Me, "Shake Me—Android Apps on Google Play", https://play.google.com/store/apps/details?id=polis.app.shakeme&hl=en, last visited on May 13, 2016, pp. 1-6.

Shake Screen on Off Free, "Shake Screen on Off Free—Android Apps on Google Play", https://play.google.com/store/apps/details?id=shake.screen.on.off&hl=en, last visited on Mar. 30, 2016, pp. 1-4.

Shake to Unlock, "Shake to Unlock—Android Apps on Google Play", https://play.google.com/store/apps/details?id=com.ndtsoft.shaketounlock&hl=en, last visited on Mar. 30, 2016, pp. 1-4.

appcrawlr.com., "10 Best Apps for Shake to Unlock", http://appcrawlr.com/android-apps/best-apps-shake-to-unlock, last visited on Mar. 30, 2016, pp. 1-5.

Shake for Help, "Shake for Help—Stop Bullying—Android Apps on Google Play", https://play.google.com/store/apps/details?id=com.shakeforhelp&hl=en, last visited on May 13, 2016, pp. 1-5.

dailymail.com., "Out of battery? Just give your phone a quick shake", http://www.dailymail.co.uk/sciencetech/article-2232830/Out-battery-Just-phone-quick-shake-charge.html, Nov. 14, 2012, pp. 1-3.

* cited by examiner

METHOD, MEDIUM, AND SYSTEM FOR COGNITIVE PRICE TAGS BASED ON SHAKE SIGNATURE

CROSS REFERENCE TO RELATED APPLICATIONS

This application is a continuation of U.S. patent application Ser. No. 15/410,157 filed on Jan. 19, 2017, which is a continuation-in-part and claims the benefit of U.S. patent application Ser. No. 15/259,429, now U.S. Pat. No. 10,210,562, filed on Sep. 8, 2016, each of which are hereby incorporated into the present application by reference in its entirety.

BACKGROUND

The present disclosure generally relates to obtaining retail prices, and more particularly relates to a system and method of obtaining real-time price using retail smart price tags and mobile device signatures.

For the most part, prices of objects for sale in retail stores are fixed (i.e. static). At most, during a sale, a display sign or tag may state a current discount for a product which may be applied to the product upon checkout. However, the discounted price is often not updated or is incorrect at the cash register, which results in a disgruntled customer as time is spent price checking or the customer overpays without noticing the error.

There are known ways of delivering en-mass and personalized coupons offering discounts to customers. However, these methods are generally push-based; that is, if the store does not push the offer, the customer will not receive the coupon or pricing. Further, if a customer specifically wants to know about a product, they have no way of obtaining a coupon without using additional devices (such as a mobile phone/browser, etc.)

In addition, associating a product with the customer's "wants" and then searching often turns out to be a difficult task which often results in no available coupon/discount for the product associated at all.

Pull-based pricing may be present in some retail stores where separate price check counters or stations are installed, but the users need to walk to this counter to scan their product and get the price. Pull-based pricing allows stores to know how many people are actually interested in a product and allows for an aggregated analysis of popularity of a product based on numerous factors such as season, cost, time-of-day, location, etc. Pull-based pricing, when coupled with other techniques to identify who the user is, can also allow personalization of the prices, based on who is actually asking for the price (e.g., if a store knows that Alice has "20% off" coupon, the store can actually apply this coupon and display the new price to Alice).

Further, pull-based pricing also saves money for the company because in order to change prices, sales people often have to physically change the display boards and/or price tags (for example, from "30% off" to "50% off," etc.) which may require extensive manual labor and time.

While the use of smart price tags may allow for dynamic pricing, there are limited ways of identifying the user shaking the smart price tag and each has its own advantages and disadvantages. For example, finger printing may cause privacy concerns and RF-ID matching with user device is problematic when many devices are in the vicinity.

BRIEF SUMMARY

In various embodiments, a back-end price server, computer program product and a computer-implemented method for determining a dynamic price of a combination of items for sale via a smart price tag attached to one of the items are disclosed. The method comprises receiving, at a back-end price server, a request to register a user and product combination, the product associated with a first item for sale. The user and product combination is registered as a unique gesture at the back-end server. The back-end price server receives a request for a current price for a combination of the first item for sale and a second item for sale and the current price of the combination of the first item for sale and the second item for sale for a user profile handle mapped to the unique gesture is determined.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Embodiments of the present disclosure provide a system and associated methods to obtain real-time prices of products in physical stores, in response to a price quotation pull request of a given product expressed by a customer using a smart price tag attached to the product, where the system knows which product the smart price tag is associated with. The smart price tag may use motion detection (such as, shake detection) so that the customer makes a pull request by performing certain gestures directly on the smart price tag or the product (such as shaking the smart price tag itself or shaking the product such that the smart price tag also shakes). The customer registers a unique user signature motion with the system and is identified by shaking the product with the smart price tag attached using the unique user signature motion. Custom pricing for the identified user may then be sent to the smart price tag.

Operating Environment

Figure 1:
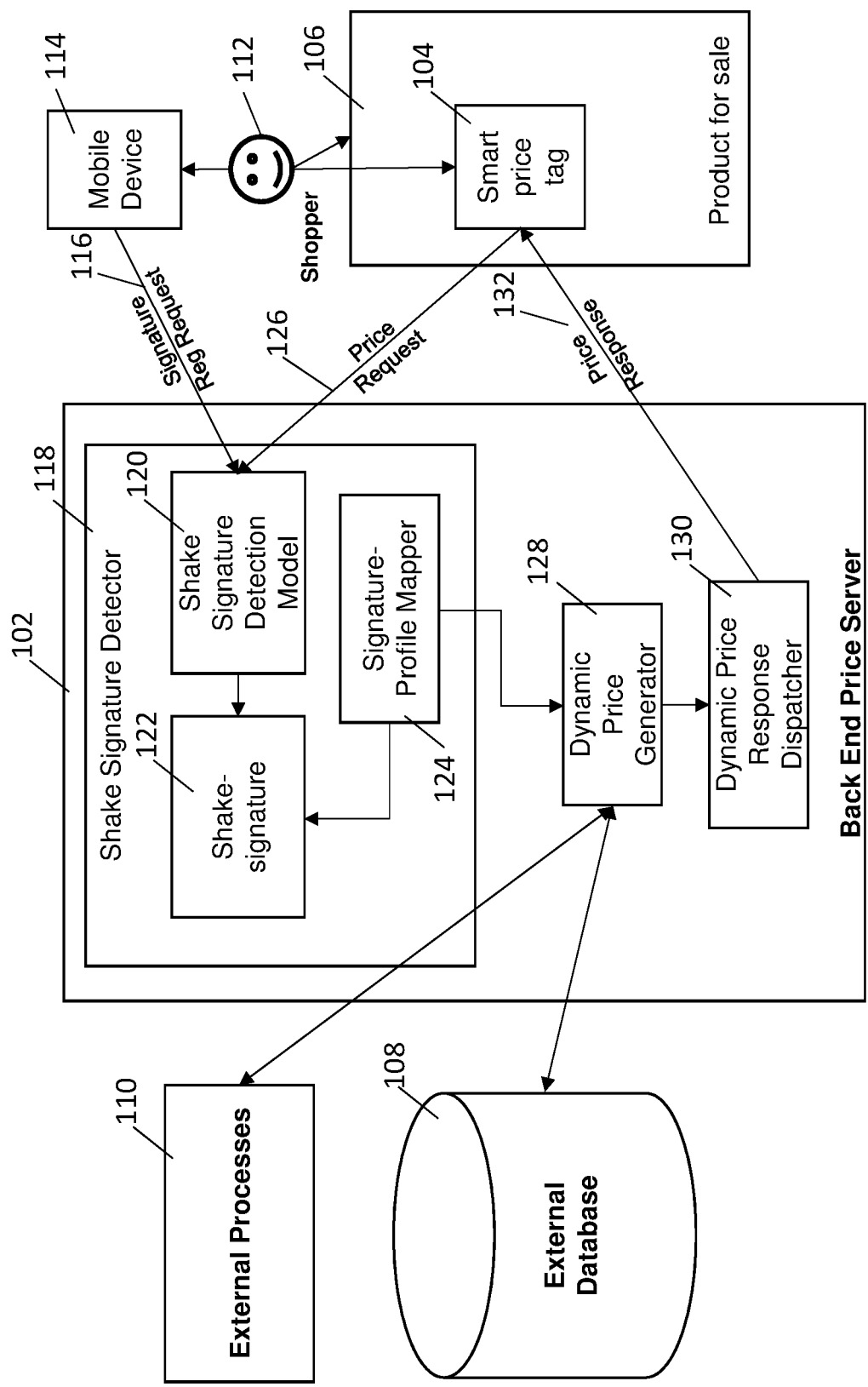
FIG. 1 is a block diagram illustrating one example of an operating environment comprising a pricing system according to one embodiment of the present invention.

FIG. 1 shows one example of an operating environment of a price checking system 100 for providing real-time price quotes and discount offers for a specific item for sale and specific customer according to one embodiment of the invention. The operating environment 100 comprises a back-end price server 102, a plurality of smart price tags 104 (one shown) and, optionally, an external database 108 and/or external processes 110 for dynamic price generation. Each smart price tag 104 is a small electronic device attached to a product for sale 106 by a mechanism such as a physical hook, a security pin, a sticky surface, a locking tag, etc. The attachment mechanism may be operably coupled with a tamper sensor to verify that the smart price tag 104 may only be attached to the specific associated item for sale 106 and detect if the smart price tag 104 is removed or tampered with. If such tampering or removal is detected, the smart price tag 104 may deactivate itself and/or send a notification to the back-end price server 102 for reporting purposes.

When a shopper 112 enters a retail shop, for example, he may register a unique user signature motion by shaking his mobile device 114. Motion sensors within the mobile device (not shown) can detect the specific shaking pattern using existing technologies. Examples of user signature motions may include simple gestures, a user 112 shaking his mobile device 114 in a pattern in the air, writing a sequence of alphabet characters, etc. The mobile device 114 requests to register the user signature motion with the back-end price server 102 by sending a signature registration request 116 to a shake signature detector 118 comprising a shake signature detection model 120 and a signature profile mapper 122. The shake signature detection model 120 detects when the back-end price server 102 receives a shake signature 122, such as a user signature motion, and stores the shake signature 122. The signature profile mapper 124 maps the shake signature 122 to a profile handle and stores the resultant mapping. An example mapping table is shown below in Table 1.

TABLE 1

| User Registered Shake-signature | Public Profile Handle |
| --- | --- |
| ASD | Handle 1 |
| FGE | Handle 2 |
| QWE | Handle 3 |

Figure 2:
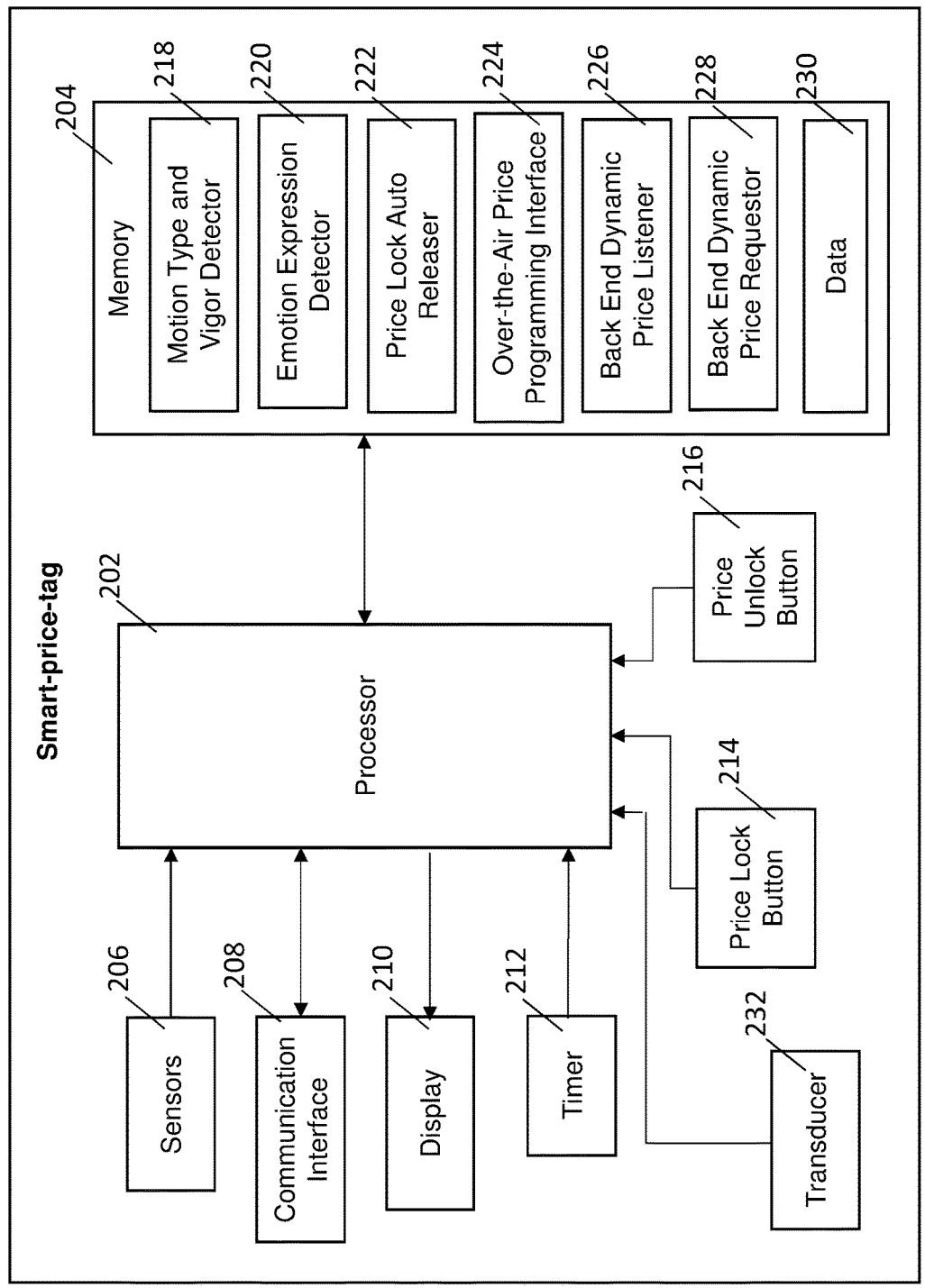
FIG. 2 is a block diagram of one example of a smart price tag used in accordance with one example of the present invention.

A detailed block diagram of an example smart price tag is shown in FIG. 2 in accordance with one example of the present invention. The smart price tag 104 includes a processor 202 operably coupled to a memory 204, one or more sensors 206 (such as an accelerometer, a gyroscope, etc.), a communication interface 208, a display 210, a timer 212, two buttons (a price lock button 214 and a price unlock button 216) and an optional transducer 232 (such as a speaker, vibrator, siren, buzzer, etc.).

The communication interface 208 allows the smart price tag 104 to communicate with the back end price server 102 using short range communication protocols (such as Wi-Fi, Bluetooth, etc.).

The display 210 may be a simple low-power light emitting diode (LED) display, a liquid crystal display (LCD) or other type of display.

The memory 204 stores various elements for performing the functions of the methods discussed herein (such as a motion type and vigor detector 218, an emotion expression detector 220, a price lock auto releaser 222, an over-the-air programming interface 224, a back end dynamic price listener 226 and a back end dynamic price requestor 228) as well as accompanying data 230. The over-the air programming interface 224 allows the smart price tag 104 to be logically associated with a specific item for sale 106.

When a shopper 112 wishes to request a price check for a particular item, the shopper 112 simply shakes the product for sale 106 which has a smart price tag 104 attached, or shakes the smart price tag 104 itself. The smart price tag's 104 motion sensor 206 detects the shaking motion and characterizes the motion using the motion type and vigor detector 218. If the shaking motion matches certain predetermined characteristics, which are described in more detail below and may include a valid user signature motion, the dynamic price requestor 228 sends a dynamic price request 126 to the shake signature detector 118 of the back-end price server 102 via the communication interface 208. A dynamic price generator 128, which may be in communication with the external database 108 and various external processes 110 for dynamic price generation, generates a price for the product for sale 106 corresponding to the requesting smart price tag 104 which may be customized for the user whose profile handle is mapped to the received user signature motion. The customized price may only be valid for a predetermined period of time unless "locked in" at the smart price tag 104 by pressing the price lock button 214. The dynamic price response dispatcher 130 sends a dynamic price response 132, including the generated price, back to the smart price tag 104. The smart price tag 104 receives the dynamic price response 132 at the back end dynamic price listener 226 via the communication interface 208.

The smart price tag 104 displays the current price on the display 210 for a predetermined period of time (e.g., one minute). The customer may also have the option to lock in the price by pressing the price lock button 214 which sets the price of the item until checkout, expiration of a second predetermined time (e.g., one hour), or until the price unlock button 216 is pressed. After the price lock auto releaser 222 determines that the offered price is no longer valid, a new price may be requested by shaking the object again.

Figure 3:
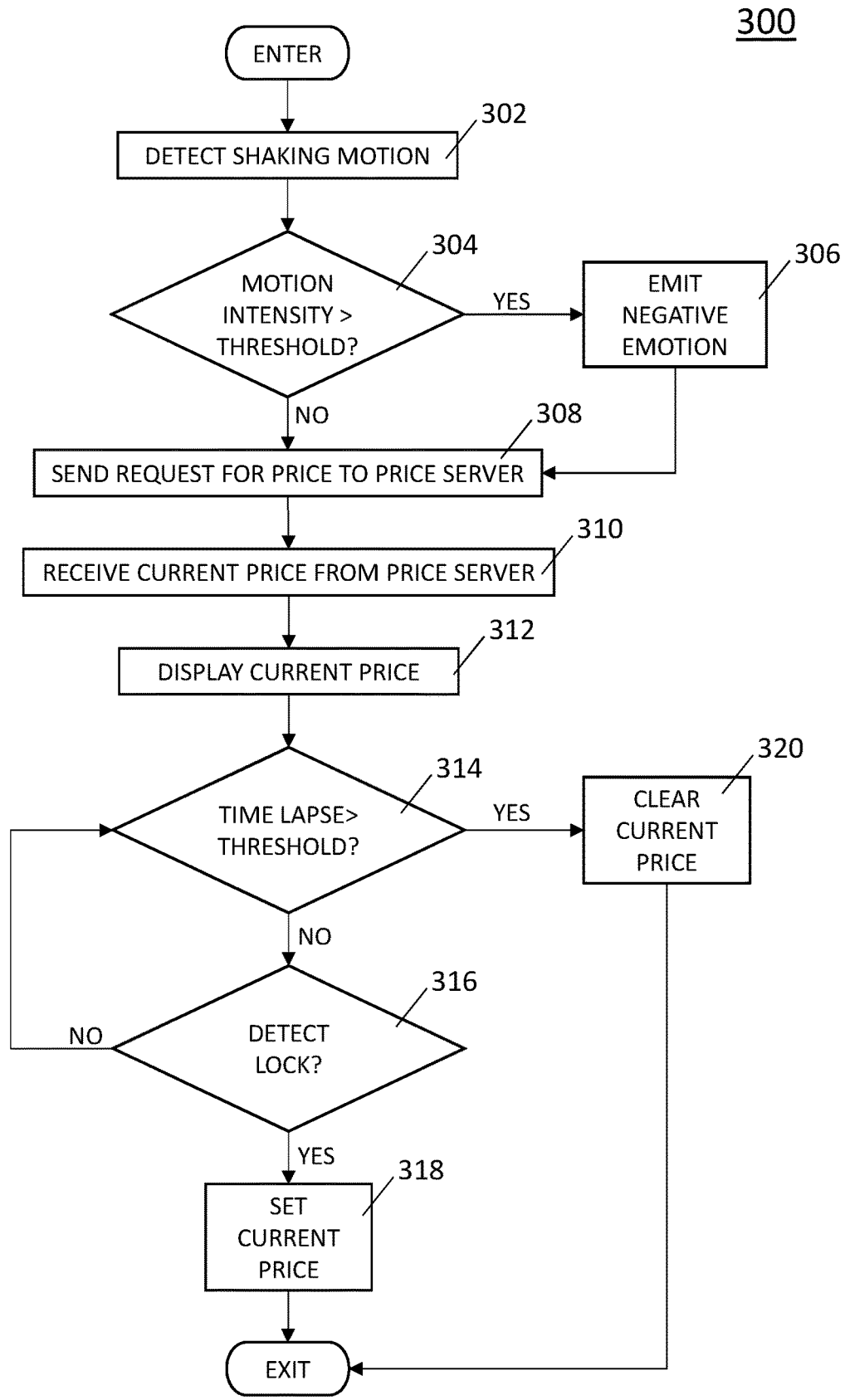
FIG. 3 is an operational flow diagram illustrating one process of receiving a price of an item for sale using the pricing system of FIG. 1 according to one embodiment of the present disclosure.

FIG. 3 is an operational flowchart 300 describing a method of requesting a current price of an item for sale 106 attached to and associated with a smart price tag 104 according to one embodiment of the present disclosure. Beginning in step 302, the sensor 206, operating in conjunction with the motion type and vigor detector 218 detects a shaking motion (i.e. detects that the smart price tag 104 is being shaken). It should be noted that the intensity of the shaking motion should be above a first predetermined threshold level in order to indicate actual shaking. However, if the motion intensity is greater than a second predetermined level, at step 304, there is a greater likelihood that the smart price tag 104 could be damaged by the vigor of the shaking. Thus, the smart price tag 104 may voice its "objection" to the degree of shaking by emitting, at step 306, a negative emotion (such as by sounding a warning through the transducer 232, displaying a warning message on the display 210, vibrating, etc.). It should be noted that the second predetermined intensity threshold is greater than the first predetermined threshold.

At step 308, the smart price tag 104 sends a dynamic price request 126 to the back-end price server 102. The back-end price server 102 determines a current price for the attached item of sale based on a number of factors. For example, the item for sale may be associated with a default or nominal base price, but may be adjusted up or down according to a number of factors. The price may be adjusted based on the current supply and demand of the item for sale 106 based on a given calendar day, during a given time of year or season, for a particular time of day, given crowd levels in the store, given online competition, given manufacturing/wholesale purchasing and warehousing costs, given other expenses, etc. For example, the price may be increased as the current in-store supply is diminished if the item is awaiting an expected incoming shipment; however, the price could also be decreased as the current in-store supply levels decrease if the item is marked for clearance. Various external methodologies may be used to find the best pricing of the product to jointly optimize store profitability and customer affordability.

The smart price tag 104 receives, at step 310, the current price for the attached item for sale 106 and displays, at step 312, the current price on the display 210 for a first predetermined period of time (e.g., one minute, 5 minutes, etc.). The current price is valid for the item for sale for a second predetermined period of time (e.g., one hour, thirty minutes, fifteen minutes, etc.) or for a longer duration if the user locks in the price. Thus, if the time lapsed since the smart price tag 104 has received the current dynamic price is less than the second predetermined period of time, at step 314, the smart price tag 104 maintains the current price. If the smart price tag 104 detects, at step 316, a lock request (e.g., user presses the price lock button 214 within the second predetermined time), the price of the item is locked (i.e. "set"), at step 318, at the current price level until the customer checks out, the smart price tag 104 detects the price unlock 216 button has been pressed, or a third predetermined period of time has passed (e.g., six hours, 24 hours) in which it can reasonably be assumed that the customer no longer desires to purchase the item. If the price lock button 214 is not pressed within the second predetermined period of time, at step 314, the current price is cleared, at step 320, and a new price will be generated when a customer shakes the item/smart price tag again.

By implementing the smart price tag system 100, a retail store is able to collect, aggregate and analyze real-time user-interest data to more intelligently set prices. The collected data may be used to generate reports and feedback to detail how many customers were interested in the product and optimize a specific price point for which customers are willing to purchase specific items.

In a sample usage scenario, Vijay likes a certain water bottle and shakes the bottle. The smart-price-tag, secured to the bottle, experiences the shaking and issues a query to the back end price server requesting the price of the bottle. The price shown on the smart price tag display is $1. Vijay presses the "lock" button to lock the price and picks the bottle up.

However, later in the same shopping session, he sees a water bottle made of fiber glass and chooses to replace the one he locked. He similarly tries to find the price of the fiber glass bottle by shaking, and discovers that bottle is $2. He locks the price of the fiber glass bottle and picks that bottle up. He also unlocks the price of the other bottle and returns that bottle to the shelf.

Vijay later decides that he will be benefited at home (easier home logistics) by picking up both the bottles, and just one fiber glass bottle will be fine—the other bottle being an ordinary one will be acceptable. He goes back to the first bottle and again tries to find the price; however, he finds the new price of the original bottle to be $1.50 (i.e. the backend server has chosen to increase the price as quite a few other similar bottles have been sold within this time and the store currently has more customers).

Figure 4:
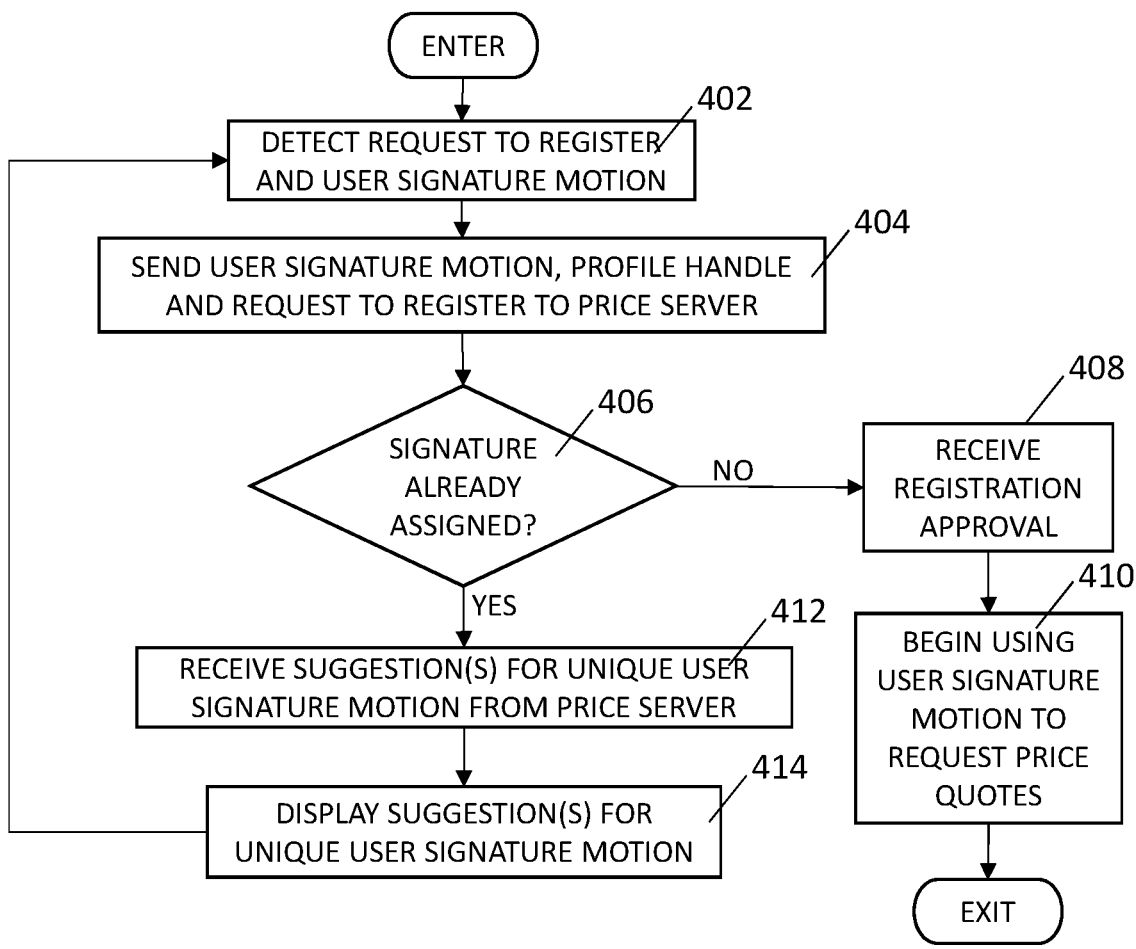
FIG. 4 is an operational flow diagram illustrating one process of registering a user signature motion with a back-end price server using a mobile device according to one embodiment of the present invention.

FIG. 4 is an operational flowchart 400 describing a method of registering a user signature motion with a back-end price server 102 using a mobile device 114 according to one embodiment of the present invention. After registration, the user signature motion may be used to request a current price of an item for sale 106 attached to and associated with a smart price tag 104. The process 400 described in FIG. 4 is from the perspective of a mobile device 114. When a user 112 of the mobile device 114 enters a retail area having a price checking system 100 with wireless coverage, the user 112 may request to register his/her own unique user signature motion to use with smart price tags 104. Beginning in step 402, the mobile device 114 detects a request to register with the price checking system 100, along with a user signature motion. Various sensors of the mobile device 114, operating according to known methods, detect the user signature motion (e.g., a motion sensor such as an accelerometer or gyroscope, a touch screen display, etc.). The request to register may be detected from launching a store application installed on the mobile device 114, from detecting an input on the mobile device 114 (e.g., the press of a button or key or a display swipe/gesture), or automatically when the mobile device 114 detects it is within wireless range of the back-end price server 102 or other wireless access point of the price checking system 100.

At step 404, the mobile device 114 sends a request to register the user signature motion, along with a representation of the user signature motion and a user profile handle for the user 112 of the mobile device 114 to the back-end price server 102. The back-end price server 102 determines if the requested user signature motion is already registered. If the user signature motion has not been previously registered, at step 406, the mobile device 114 receives a notification of registration approval from the back-end server 102, at step 408. The user 112 can then begin using the user signature motion with smart price tags 104 to request custom price quotes.

However, if the user signature motion has been previously registered, at step 406, the mobile device 114 is notified that the requested user signature motion is already taken and may receive, at step 412, suggestions for a unique user signature motion from the back-end price server 102. The mobile device 114 displays the suggestions to the user 112 and returns to step 402 to detect a new user signature motion from the user (i.e. the user gestures a different user signature motion or inputs a selection to confirm acceptance of a suggested motion).

Figure 5:
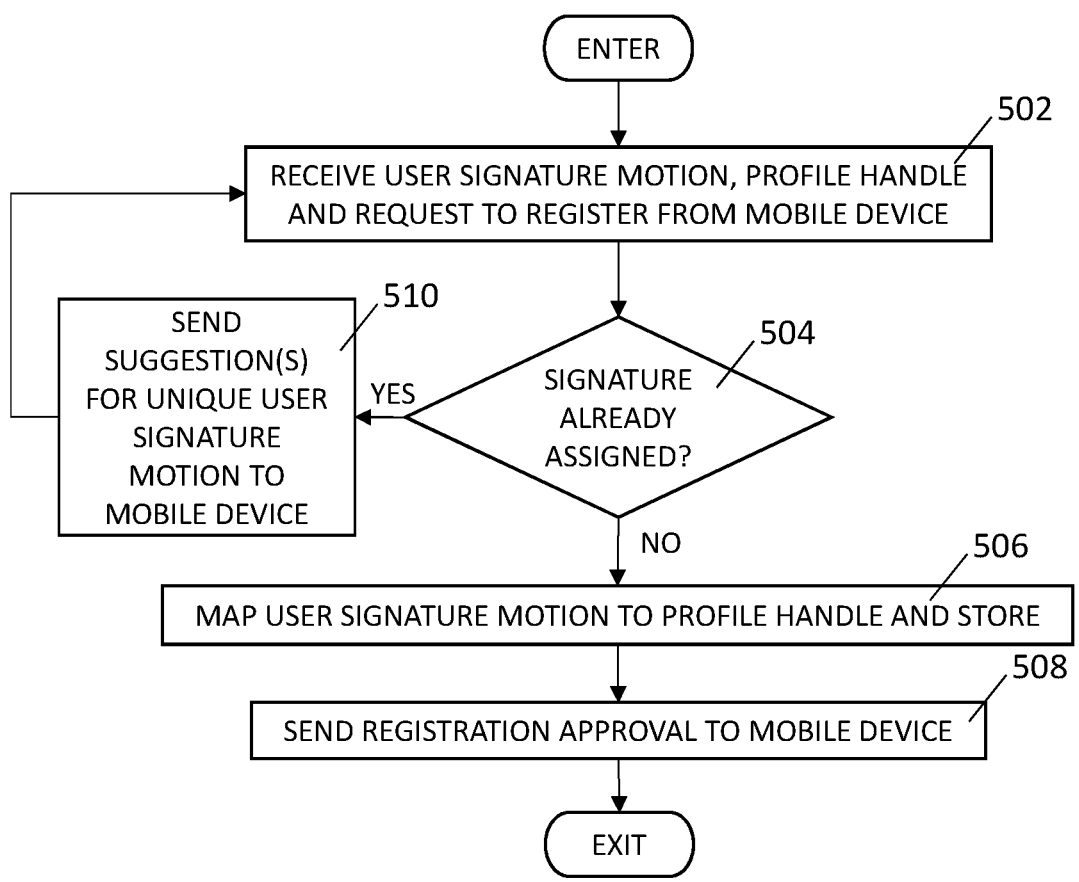
FIG. 5 is an operational flow diagram illustrating one process of registering a user signature motion by a back-end price server according to one embodiment of the present invention.

FIG. 5 is an operational flowchart 500 describing a method of registering the user signature motion with a back-end price server 102 according to one embodiment of the present invention. At step 502, the back-end server 102 receives a request to register the user signature motion, along with a representation of the user signature motion and a user profile handle for the user 112 of the mobile device 114 from the mobile device 114. The back-end price server 102, at step 504, determines if the requested user signature motion is already registered. If the user signature motion has not been previously registered, at step 506, the back-end server 102 maps the user signature motion to the user profile handle and stores the mapped pair in memory. The back-end server 102 sends a notification of registration approval to the mobile device 114, at step 508. However, if the user signature motion has been previously registered, at step 504, the back-end server 102 notifies, at step 510, the mobile device 114 that the requested user signature motion is already taken, sends suggestions for a unique user signature motion to the mobile device 114, and returns to step 502 to await receipt of a new user signature motion from a mobile device 114. The registration of the unique user signature motion will expire after a pre-determined period of time, after the price checking system 100 has determined that the user 112 has checked out, or after the price checking system 100 has determined that the mobile device 114 is no longer in wireless communication with the system.

Figure 6:
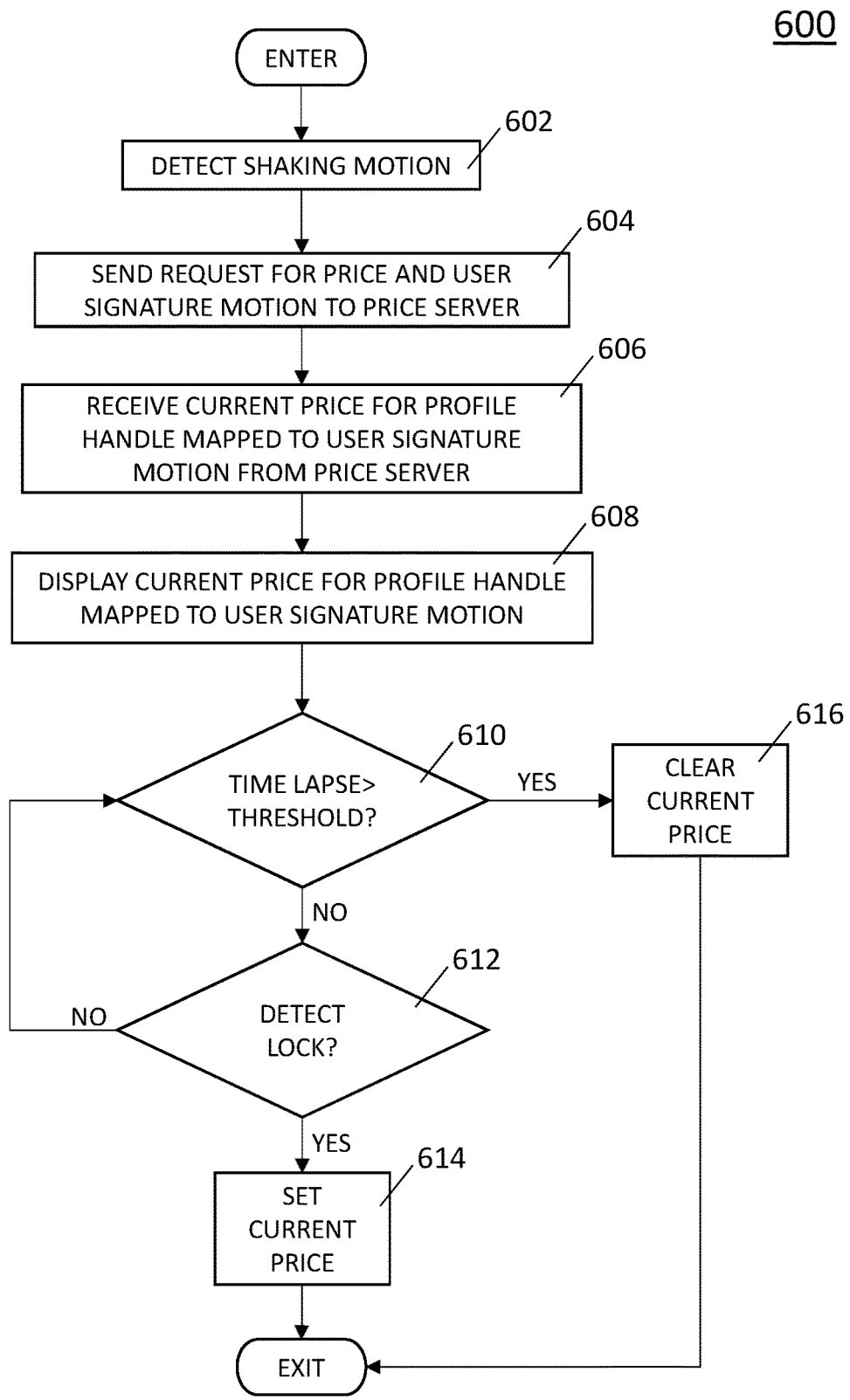
FIG. 6 is an operational flow diagram illustrating one process of receiving a price of an item for sale using the smart price tag of FIG. 2 according to one embodiment of the present invention.

FIG. 6 is an operational flow diagram 600 illustrating one process of receiving a custom price of an item for sale using a smart price tag 104 and a unique user signature motion according to one embodiment of the present invention. The method described in FIG. 6 is from the perspective of the smart price tag 104. Beginning in step 602, the sensor 206 of the smart price tag 104, operating in conjunction with the motion type and vigor detector 218, detects a shaking motion (i.e. detects that the smart price tag 104 is being shaken). The user 112 shakes the smart price tag 104 using the same motion that he/she registered with the back-end server 102 using the mobile device 114. It should be noted that the intensity of the shaking motion should be above a first predetermined threshold level in order to indicate actual shaking. However, if the motion intensity is greater than a second predetermined level there is a greater likelihood that the smart price tag 104 could be damaged by the vigor of the shaking. Thus, the smart price tag 104 may voice its "objection" to the degree of shaking by emitting a negative emotion (such as by sounding a warning through the transducer 232, displaying a warning message on the display 210, vibrating, etc.). It should be noted that the second predetermined intensity threshold is greater than the first predetermined threshold. Also, if the user registered a gesture as the user signature motion using the display of the mobile device 114 as an input device, e.g., the user may have written a series of letters upon the display screen, the user signature motion may be communicated by the smart price tag 104 by moving the smart price tag 104 to simulate writing the series of letters.

At step 604, the smart price tag 104 sends a dynamic price request 126 to the back-end price server 102, along with a representation of the user signature motion. The back-end price server 102 determines a custom current price for the attached item of sale based on a number of factors. For example, the item of sale may be associated with a default or nominal base price, but may be adjusted up or down. The price may be adjusted based on the current supply and demand of the item for sale 106 based on a given calendar day, during a given time of year or season, for a particular time of day, given crowd levels in the store, given online competition, given manufacturing/wholesale purchasing and warehousing costs, given other expenses, etc. For example, the price may be increased as the current in-store supply is diminished if the item is awaiting an expected incoming shipment; however, the price could also be decreased as the current in-store supply levels decrease if the item is marked for clearance. Various external methodologies may be used to find the best pricing of the product to jointly optimize store profitability and customer affordability. Additionally, offers exclusive to the registered user 112 may be extended, such as offers for frequent shopping, offers exclusive to club members or registered users, daily offers, offers based on the amount of money the customer has previously spent at the retail store, offers for birthdays or holidays, etc.

The smart price tag 104 receives, at step 606, the current custom price for the attached item for sale 106 and displays, at step 608, the current custom price on the smart price tag display 210 for a first predetermined period of time (e.g., one minute, 5 minutes, etc.). The current price is valid for the item for sale for a second predetermined period of time (e.g., one hour, thirty minutes, fifteen minutes, etc.) or for a longer duration if the user locks in the price. Thus, if the time lapsed since the smart price tag 104 has received the current dynamic price is less than the second predetermined period of time, at step 610, the smart price tag 104 maintains the current price. If the smart price tag 104 detects, at step 612, a lock request (e.g., user presses the price lock button 214 within the second predetermined time), the price of the item is locked (i.e. "set"), at step 614, at the current price level until the customer checks out, the smart price tag 104 detects the price unlock 216 button has been pressed, or a third predetermined period of time has passed (e.g., six hours, 24 hours) in which it can reasonably be assumed that the customer no longer desires to purchase the item. If the price lock button 214 is not pressed within the second predetermined period of time, at step 612, the current price is cleared, at step 616, and a new price will be generated when a customer shakes the item/smart price tag again.

By implementing the smart price tag system 100, a retail store is able to collect, aggregate and analyze real-time user-interest data to more intelligently set prices. The collected data may be used to generate reports and feedback to detail how many customers, and more importantly, which specific user, was interested in the product and optimize a specific price point for which customers are willing to purchase specific items. In addition, the retail store may target specific advertisements and discounts offers to that customer in the future for similar or related items.

Figure 7:
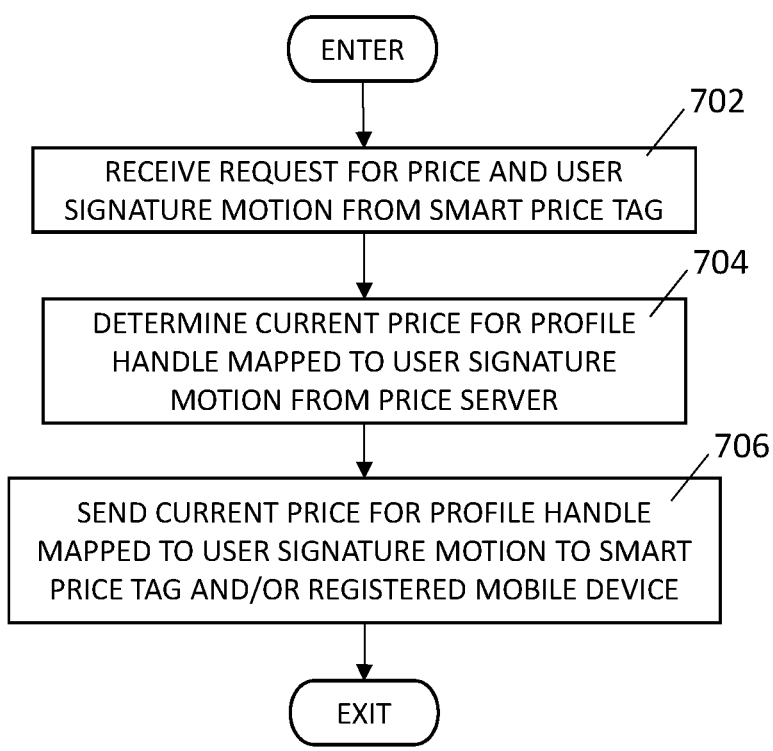
FIG. 7 is an operational flow diagram illustrating one process of determining a price of an item for sale using a back-end server according to one embodiment of the present invention.

FIG. 7 is an operational flow diagram 700 illustrating one process of determining, by a back-end server 102, a custom price of an item for sale using a smart price tag 104 and a unique user signature motion according to one embodiment of the present invention. At step 702, the back-end server 102 receives a request for a custom price, along with a representation of a user signature motion, from a smart price tag 104 associated with an item for sale 106. The back-end server 102 determines, at step 704, a current custom price for the item for sale 106 that is specifically intended for the user 112 whose user profile handle is mapped to the received user signature motion. The back-end server 102 may determine the custom price based on a number of factors such as those described above. The back-end server 102 sends, at step 706, the current price of the item for sale 106 designated for the user profile handle mapped to the received user signature motion to the requesting smart price tag 104 and/or the mobile device 114 associated with the mapped user profile handle. The custom current price is valid for a predetermined period of time, or may be locked in for a longer period of time at the smart price tag 104 as described above.

In certain scenarios, higher discounts may be extended to the customer when the customer makes cumulative purchases, particularly for related items. For example, a retail store that sells cellular phones may offer additional discounts by bundling related items, such as a protective case, a charger, headphones, etc. By using the smart price tags 104 in combination with a user signature motion, the user 112 may create a user/product combination motion signature to request cumulative discounts on multiple products. The back-end server 102 maps a user signature motion and a product signature motion together to provide cumulative discounts to additional products when the user/product combination is received from a smart price tag 104 associated with a different (or related) product.

In the previous embodiment, where a motion signature is assigned to user 112, whenever the user 112 shakes a smart-price tag 104 in his signature pattern, the back-end server 102 knows which user (from shake pattern) and which product (from the smart-tag registration) are requested and renders customized coupons. However, this alone will not help a user get customized discounts on a bundle of products. For example, a price for 1) Alice: bread+butter, is different from the price for 2) Alice: bread+butter+jam, which is different from 3) Bob: bread+butter+jam. When Alice is picking up butter, she has no way of querying—"What is the price offered if I buy bread and butter?".

Figure 8:
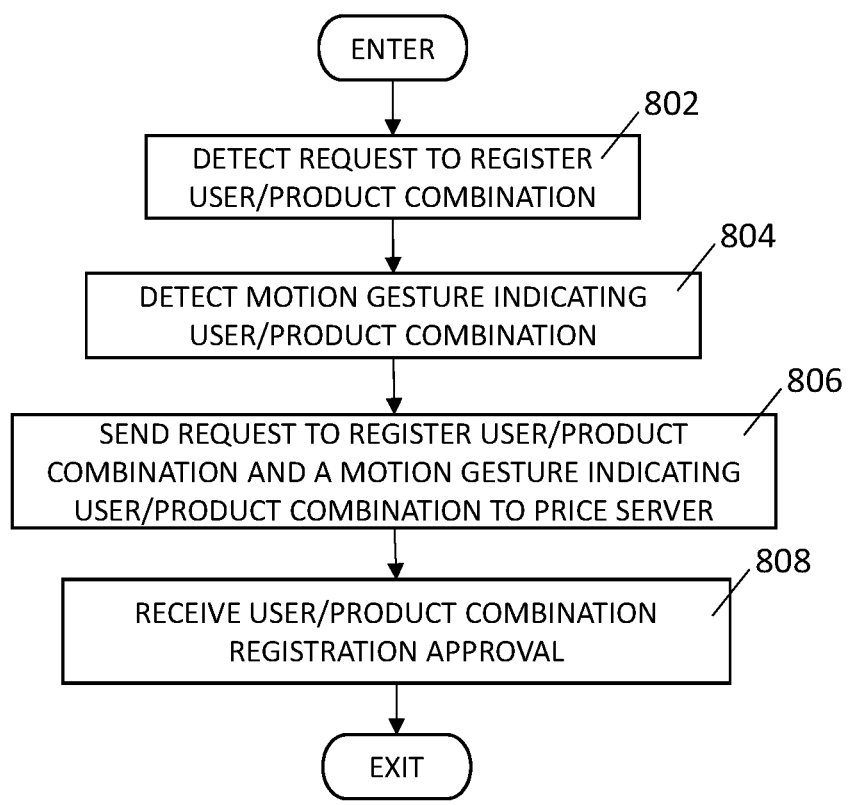
FIG. 8 is an operational flow diagram illustrating one process of registering a motion user/product combination signature with a back-end price server using a smart price tag according to one embodiment of the present invention.

FIG. 8 is an operational flow diagram illustrating one process of registering a user/product combination motion signature with a back-end price server using a smart price tag according to one embodiment of the present invention. Beginning at step 802, the smart price tag 104 detects a request to register a user/product combination. The request may be entered by various means, including but not limited to, selecting a dedicated input button or key or detecting a particular shake-pattern or gesture. At step 804, the smart price tag 104 detects a motion gesture indicating a user/product combination. For example, going back to the above scenario with Alice, Alice's signature is known from a previous user signature registration. Her signature registration can remain the same. Suppose her signature is to shake the product's smart tag in shape "A." Alice may press a button on the smart price tag 104 to indicate a registration stage, and writes "A&B" in the air using the smart price tag 104. In this example, "A" is Alice's signature, "&" is a predefined delimiter in the price checking system 100, and "B" stands for Alice's signature for "Bread." So "A&B" gets registered as Alice's signature for bread. She can now release the button on the smart price tag 104.

The smart-price tag 104 sends, at step 806, a request to register the user/product combination along with a motion gesture representing the user/product combination to the back-end server 102. The smart price tag 104, optionally, receives a registration approval, at step 808, for the user/product combination signature. The user 112 may now use the user/product combination signature to request cumulative discounts.

Figure 9:
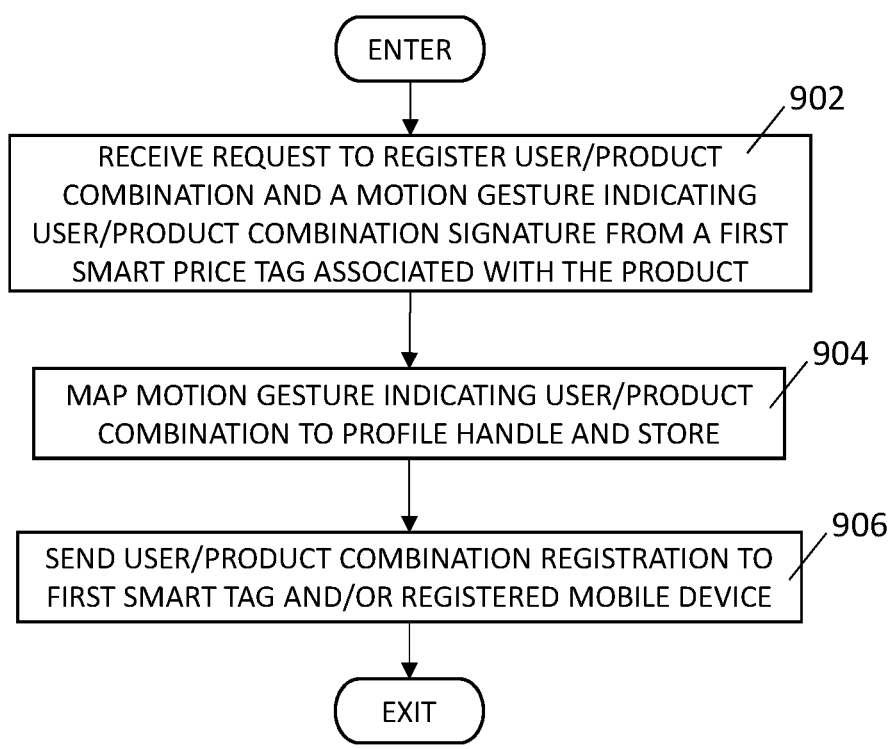
FIG. 9 is an operational flow diagram illustrating one process of registering a motion user/product combination signature by a back-end price server according to one embodiment of the present invention.

FIG. 9 is an operational flow diagram illustrating one process of registering a motion user/product combination signature by a back-end price server according to one embodiment of the present invention. The back-end server 102 receives, at step 902, a request to register a user/product combination and a motion gesture indicating a user/product combination signature from a first smart price tag 104 that is associated with the product. The back-end server 102 maps, at step 904, the user/product combination signature to the user profile handle of the user 112 and stores this information. The back-end server 102 optionally sends, at step 906, the user/product combination to the first smart price tag 104 and/or the mobile device 114 associated with the user profile handle.

Figure 10:
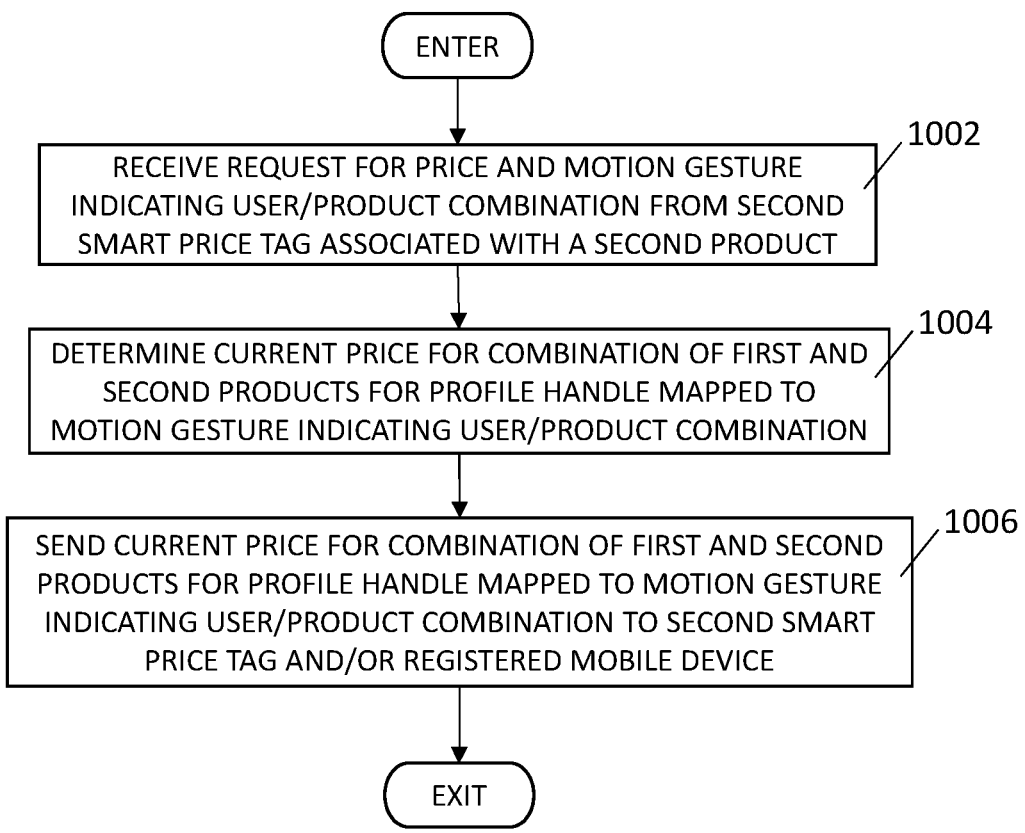
FIG. 10 is an operational flow diagram illustrating one process of determining a price of a combination of items for sale using a back-end server according to one embodiment of the present invention.

FIG. 10 is an operational flow diagram illustrating one process of determining a price of a combination of items for sale using a back-end server 102 according to one embodiment of the present invention. The back-end server 102 receives, at step 1002, a dynamic price request and a motion gesture indicating a user/product combination signature from a second smart price tag that is associated with a second product. The back-end server 102 determines, at step 1004, if there are any discounts available for the combination of the first product and the second product for the profile handle mapped to the motion gesture indication the user/product combination of the user 112 and the first product. The back-end server 102 sends, at step 1006, the current price for the combination of first and second products for the profile handle mapped to the motion gesture indicating the user/profile combination signature to the second smart price tag and/or the mobile device association with the user profile handle.

Continuing with the previous example, Alice has registered her signature for bread. Now she walks to pick up butter. She can shake the smart price tag on butter using the gesture "A&B." When Alice does so, the price checking system 100 realizes that the gesture is Alice's signature for bread. Also, since the smart price tag she shakes is butter's tag, the system knows Alice is interested in "Bread" AND "Butter" and gives her the cumulative price. These steps enable customizing price of a bundle of items to a user.

Back-End Price Server

Figure 11:
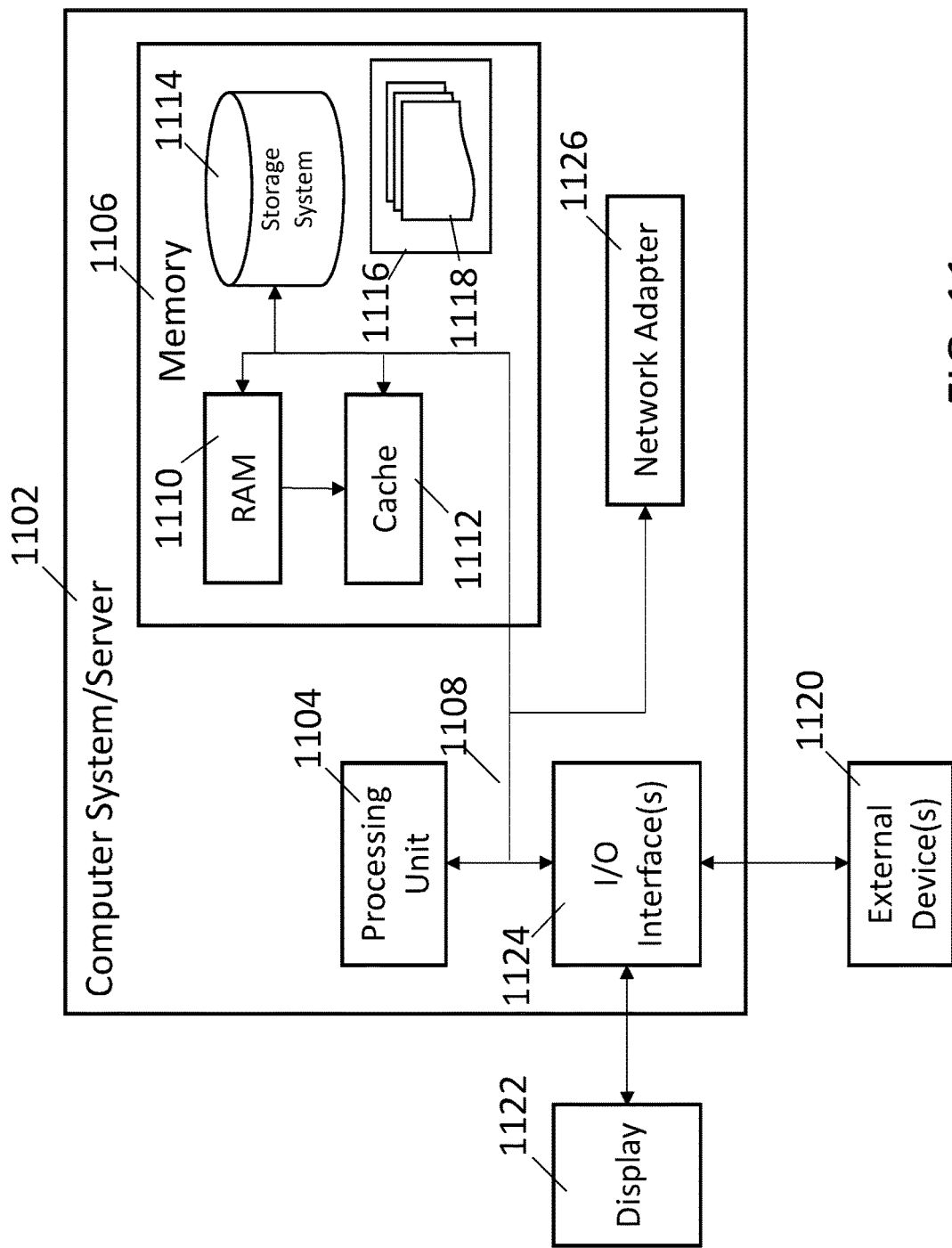
FIG. 11 is a block diagram of one example of a back-end price server according to one embodiment of the present invention.

Referring now to FIG. 11, a block diagram illustrating an information processing system 1100 that can be utilized in embodiments of the present disclosure is shown. The information processing system 1102 is based upon a suitably configured processing system configured to implement one or more embodiments of the present disclosure (e.g., price checking system 100). Any suitably configured processing system can be used as the information processing system 1102 in embodiments of the present disclosure. The components of the information processing system 1102 can include, but are not limited to, one or more processors or processing units 1104, a system memory 1106, and a bus 1108 that couples various system components including the system memory 1106 to the processor 1104.

The bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 11, the main memory 1106 may include shake signature detector 118, dynamic price generator 128 and dynamic price response generator 130 shown in FIG. 1. One or more of these components can reside within the processor 1104, or be a separate hardware component. The system memory 1106 can also include computer system readable media in the form of volatile memory, such as random access memory (RAM) 1110 and/or cache memory 1112. The information processing system 1102 can further include other removable/non-removable, volatile/non-volatile computer system storage media. By way of example only, a storage system 1114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1108 by one or more data media interfaces. The memory 1106 can include at least one program product having a set of program modules that are configured to carry out the functions of an embodiment of the present disclosure.

Program/utility 1116, having a set of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of embodiments of the present disclosure.

The information processing system 1102 can also communicate with one or more external devices 1120 (such as a keyboard, a pointing device, a display 1122, etc.); one or more devices that enable a user to interact with the information processing system 1102; and/or any devices (e.g., network card, modem, etc.) that enable computer system/server 1102 to communicate with one or more other computing devices. Such communication can occur via I/O interfaces 1124. Still yet, the information processing system 1102 can communicate with one or more networks such as a local area network (LAN), a general wide area network (WAN), and/or a public network (e.g., the Internet) via network adapter 1126. As depicted, the network adapter 1126 communicates with the other components of information processing system 1102 via the bus 1108. Other hardware and/or software components can also be used in conjunction with the information processing system 1102. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for determining a dynamic price of a combination of items for sale via a smart price tag attached to one of the items, the method comprising:
    receiving, at a back-end price server, a request to register a user and product combination signature, the product associated with a first item for sale, the request to register a user and product combination signature being initiated by shaking a smart price tag associated with the first item for sale using a user signature motion mapped to the user profile handle;
    registering the user and product combination as a unique gesture at the back-end server;
    receiving, at the back-end price server, a request for a current price for a combination of the first item for sale and a second item for sale, the request for the current price of the combination of the first item for sale and the second item for sale being initiated by shaking a smart price tag associated with the second item for sale using the unique gesture; and
    determining the current price of the combination of the first item for sale and the second item for sale for a user profile handle mapped to the unique gesture.

2. The method of claim 1, wherein the current price of the combination of the first item for sale and the second item for sale is less than a sum of a current price of the first item for sale and a current price of the second item for sale.

3. The method of claim 1, further comprising sending the current price of the combination of the first item for sale and the second item for sale to at least one of the smart price tag or a mobile device associated with a user profile handle mapped to the user of the mobile device.

4. The method of claim 3, wherein the unique gesture comprises a user signature motion mapped to the user profile handle and a gesture representing the first item for sale.

5. The method of claim 4, wherein the unique gesture further comprises a predefined delimiter linking the user signature motion and the gesture representing the first item for sale.

6. The method of claim 1, wherein the request to register a user and product combination is initiated by selecting a dedicated input button on a smart price tag associated with the first item for sale.

7. A back-end price server comprising:
    a memory storing computer instructions;
    a communication interface;
    a processor, operably coupled with the memory and the communication interface, which
        receives a request to register a user and product combination signature, the product associated with a first item for sale, wherein the request to register a user and product combination signature is initiated by shaking a smart price taq associated with the first item for sale using a user signature motion mapped to the user profile handle;
        registers the user and product combination signature as a unique gesture at the back-end server;
        receives a request for a current price for a combination of the first item for sale and a second item for sale, wherein the request for the current price of the combination of the first item for sale and the second item for sale is initiated by shaking a smart price tag associated with the second item for sale using the unique gesture; and determine the current price of the combination of the first item for sale and the second item for sale for a user profile handle mapped to the unique gesture.

8. The back-end price server of claim 7, wherein the current price of the combination of the first item for sale and the second item for sale is less than a sum of a current price of the first item for sale and a current price of the second item for sale.

9. The back-end price server of claim 7, wherein the processor further sends the current price of the combination of the first item for sale and the second item for sale to at least one of the smart price tag or a mobile device associated with a user profile handle mapped to the user of the mobile device.

10. The back-end price server of claim 9, wherein the unique gesture comprises a user signature motion mapped to the user profile handle and a gesture representing the first item for sale.

11. The back-end price server of claim 9, wherein the unique gesture further comprises a predefined delimiter linking the user signature motion and the gesture representing the first item for sale.

12. The back-end price server of claim 7, wherein the request to register a user and product combination is initiated by selecting a dedicated input button on a smart price tag associated with the first item for sale.

13. A computer program product for determining a dynamic price of a combination of items for sale via a smart price tag attached to one of the items, the computer program product comprising:
a non-transitory storage medium, readable by a processing circuit and storing instructions for execution by the processing circuit for performing a method comprising:
receiving, at a back-end price server, a request to register a user and product combination signature, the product associated with a first item for sale, wherein the request to register a user and product combination signature is initiated by shaking a smart price tag associated with the first item for sale using a user signature motion mapped to the user profile handle;
registering the user and product combination signature as a unique gesture at the back-end server;
receiving, at the back-end price server, a request for a current price for a combination of the first item for sale and a second item for sale, wherein the request for the current price of the combination of the first item for sale and the second item for sale is initiated by shaking a smart price tact associated with the second item for sale using the unique gesture; and
determining the current price of the combination of the first item for sale and the second item for sale for a user profile handle mapped to the unique gesture.

14. The computer program product of claim 13, wherein the storage medium further stores instructions for:
sending the current price of the combination of the first item for sale and the second item for sale to at least one of the smart price tag or a mobile device associated with a user profile handle mapped to the user of the mobile device.

15. The computer program product of claim 13, wherein the unique gesture comprises a user signature motion mapped to the user profile handle and a gesture representing the first item for sale.

* * * * *